Feb. 18, 1958 D. M. CURRAN 2,823,398
PIPELINE WELD CLEANING MACHINE
Filed Sept. 26, 1955 3 Sheets-Sheet 1

INVENTOR.
Donald Michael Curran
BY
ATTORNEY.

Feb. 18, 1958 D. M. CURRAN 2,823,398
PIPELINE WELD CLEANING MACHINE
Filed Sept. 26, 1955 3 Sheets-Sheet 2

INVENTOR.
Donald Michael Curran
BY
ATTORNEY.

Feb. 18, 1958   D. M. CURRAN   2,823,398
PIPELINE WELD CLEANING MACHINE
Filed Sept. 26, 1955   3 Sheets-Sheet 3
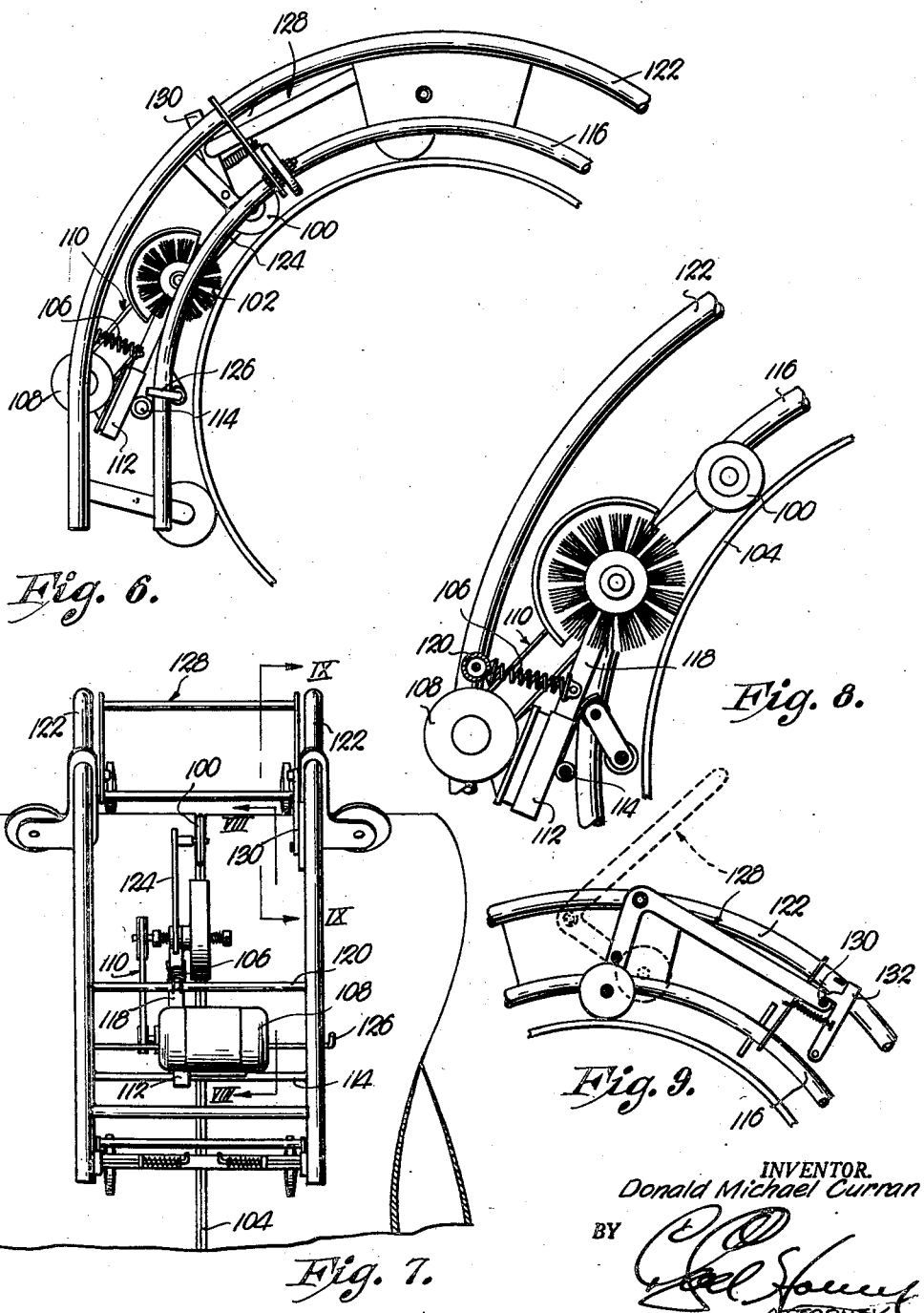
INVENTOR.
Donald Michael Curran
BY
ATTORNEY United States Patent Office 2,823,398
Patented Feb. 18, 1958

2,823,398
PIPELINE WELD CLEANING MACHINE

Donald Michael Curran, Tulsa, Okla., assignor to D. M. Curran, Tulsa, Okla., trustee Application September 26, 1955, Serial No. 536,372

5 Claims. (Cl. 15—104.04)

This invention relates to a machine for cleaning pipeline welds and more particularly to an attachment adapted for mounting on the pipeline in a manner to permit rotation therearound or longitudinal movement therealong, the primary object being to provide an inexpensive, relatively lightweight, easily manipulated assembly for speeding up the weld cleaning operation and increasing the efficiency of the cleaning operation.

A pipeline weld actually consists of four separate phases or layers of weld. The first weld, commonly referred to as a stringer bead or root bead is made while the pipe joints are held in place by line-up clamps with which those versed in this field are familiar.

Before the succeeding layers are applied, it is necessary to remove substantially all of the slag appearing on the surface of the preceding weld. The second, or "hot pass" weld is applied directly to the surface of the stringer bead and the slag of the latter must similarly be removed before the two filler bead welds are applied.

Normally, there is a 30° bevel at the joint and the stringer bead is applied at the very bottom of the notch thus presented. Accordingly, the first two operations are the most difficult so far as slag removal is concerned and the manual cleaning operations heretofore employed, have not been entirely satisfactory.

It is the most important object of the present invention to provide a machine for removing slag from each of the four welds, which machine may remain on the pipeline at all times and, therefore, be out of the way of welding equipment and easily and quickly placed in use so that succeeding welds may be applied without loss of time.

Another important object of the instant invention is the provision of a weld cleaning machine that includes a frame partially surrounding the pipeline and provided with rollers so that the frame and the cleaning means thereon may be rotated around the pipeline at the joint.

A further object of the present invention is to provide a machine of the aforementioned character that includes wheels for shifting the same longitudinally of the pipe, together with structure for shifting the frame so that the rollers engage the pipe during rotation of the frame and the wheels support the frame during longitudinal movement.

Other objects include the way in which the machine is made so as to clear skids, wooden blocks or other supporting structure for the pipeline during movement of the machine from one joint to the next; the manner of placing the frame under tension so that it will remain clamped to the pipeline during rotation thereof; the way in which a rotatable wire brush is swingably mounted on the frame and yieldably held in engagement with the weld during rotation of the frame; and other important objects including details of construction, all to be made clear as the following specification progresses.

In the drawings:

Fig. 6 is a fragmentary view similar to Fig. 1 showing a modified form of the invention.

Fig. 7 is a view similar to Fig. 4 showing the form of Fig. 6.

Fig. 8 is a fragmentary cross-sectional view taken on line VIII—VIII of Fig. 7; and Fig. 9 is a fragmentary cross-sectional view taken on line IX—IX of Fig. 7.

Figure 1:
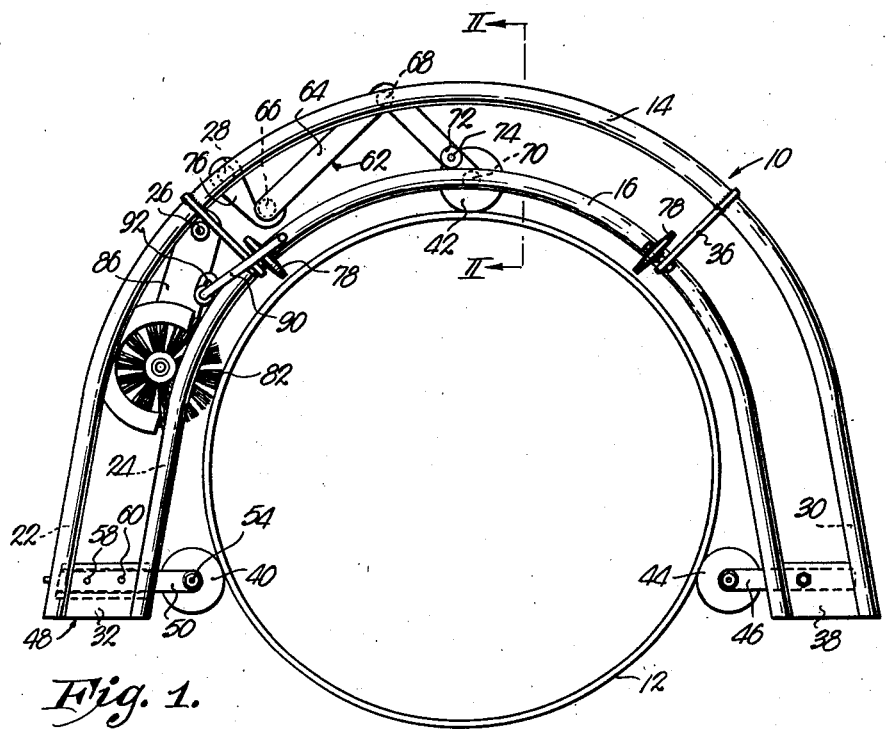
Figure 1 is an elevational view of a pipeline weld-cleaning machine made according to one form of the present invention showing the same operably mounted on a pipeline.
Figure 2:
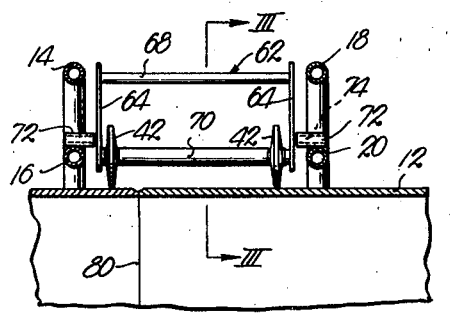
Fig. 2 is a fragmentary, transverse cross-sectional view taken on line II—II of Fig. 1.

In the form of my invention shown in Figs. 1–5 of the drawings, a frame broadly designated by the numeral 10 is adapted to partially surround a pipe 12, as best seen in Fig. 1, and to this end there is provided two pairs of arcuate, preferably tubular frame members designated by the numerals 14, 16, 18 and 20 all interconnected through various elements including cross-rods 22, 24, 26, 28 and 30, as well as by radial bars 32, 34, 36 and 38.

It is noted that the frame 10 circumscribes more than one-half of the pipeline 12 and, therefore, when the same is clamped thereto by three sets of rollers 40, 42 and 44, the entire machine may be rotated about the pipeline 12 without becoming displaced therefrom. The two rollers 44 are attached to the bar 38 at one end of the frame 10 through the medium of radial brackets 46, whereas the two rollers 40 are shiftable radially toward and away from the pipe 12. To this end, there is provided a U-shaped bracket 48, the bight whereof spans the distance between the frame members 14—16 and the frame members 18—20. The bars 32—32 constitute the legs of the bracket 48 and are formed to present tracks for slide plates 50 that are in turn connected by a cross element 52 and by a shaft 54 for rollers 40. L-shaped, spring-loaded locking pins 56 reciprocably carried by the cross element 52 and extending through the corresponding slide plates 50, alternately engage in openings 58 and 60 formed in bars 32.

The two rollers 42 are carried by an off-center lock 62 that includes a pair of L-shaped arms 64, in turn interconnected by rods 66 and 68, and by a shaft 70 for the rollers 42. Bearings 72 secured to the frame members 16 and 20 receive out-turned pintles 74 mounted on the arms 64 to the end that the entire lock 62 may be swung from the full-line position shown in Fig. 3 to the dotted-line position where cross rod 66 rests in hooks 76 secured to the cross rod 28.

Figure 3:
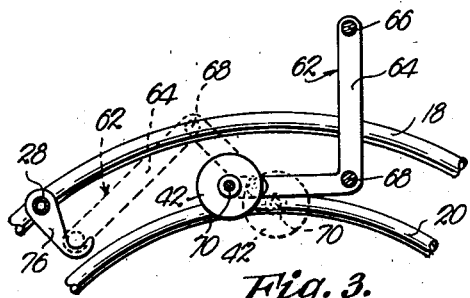
Fig. 3 is a fragmentary, cross-sectional view taken on line III—III of Fig. 2.
Figure 4:
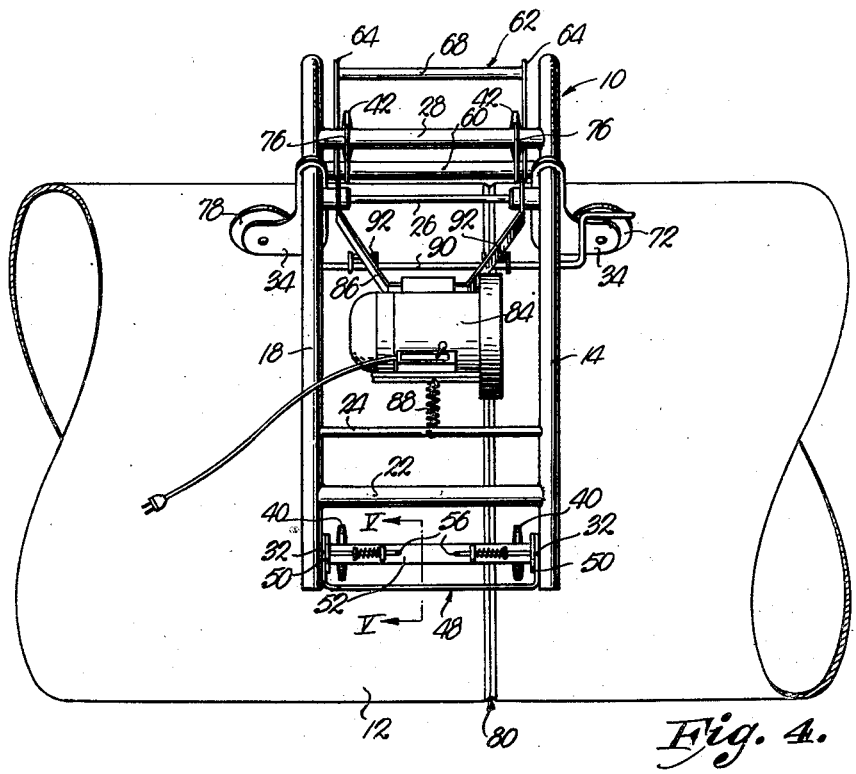
Fig. 4 is a front elevational view showing the machine mounted on a pipeline.
Figure 5:
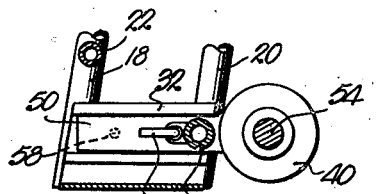
Fig. 5 is a detailed, cross-sectional view taken on line V—V of Fig. 4.

When the lock 64 is in the full-line position shown in Fig. 3, the frame 10 is shifted toward the pipe 12 where it is supported by four wheels 78 rotatably carried by bars 34.

A cleaner for the welds at joint 80 consists of a wire brush 82 secured to the drive shaft of a prime mover such as an electric motor 84, the latter of which is swingably carried by the frame 10 through the medium of a yoke 86 mounted on the cross rod 26. A spring 88 interconnecting the motor 84 and the cross rod 24, yieldably biases the brush 82 toward the joint 80.

The brush 82 may be swung away from the pipe 12 through use of a crank 90 rotatably carried by the frame elements 16 and 20 and provided with laterally disposed rollers 92 engageable with the yoke 86. By drawing of the pins 56 inwardly, the rollers 40 may be retracted and thus held when the pins 56 are engaged within the openings 58. Thereupon the entire machine may be placed upon the pipeline 12 in operative relationship to the joint 80. Thereupon the rollers 40 are shifted toward the pipe 12 and the pins 56 caused to engage within the openings 60.

When the lock 62 is swung to the position shown in Fig. 1, all six rollers 40, 42 and 44 are brought into tight engagement with the pipe 12 and by virtue of the resiliency of the frame 10, a slight tension is placed thereon. Crank 90 may then be swung clockwise to the position shown in Fig. 1, thereby lowering the brush 82 in the joint 80 and the entire machine rotated about the pipe 12 merely by grasping the frame members 14 and 18 and the various tie rods 22, 28 and 30. With motor 84 energized during such rotation of the frame 10, the slag of the weld being cleaned in the joint 80, is entirely removed, and while the lock 62 will hold the machine in proper alignment with respect to the joint 80, the rotating brush 82 will track along the joint 80 to compensate for any slight misalignment.

As soon as the operation is complete, it is but necessary to swing the brush 82 out of engagement with the pipe 12 by manipulation of crank 90, whereupon the entire machine may be shifted longitudinally of the pipeline 12 to the next weld after swinging the lock 62 to the full-line position shown in Fig. 3. This action releases the tension of the rollers 40, 42 and 44 on the pipe 12 and moves the wheels 78 into engagement with the pipe 12.

It is noteworthy that the machine remains on the pipeline 12 at all times and is, therefore, out of the way of any other equipment such as the welding trucks that are constantly moving from one joint to the next. Furthermore, during the longitudinal movement of the machine along the pipeline when supported by the wheels 78 in the position shown in Figs. 1 and 4, the skids, wooden blocks and other structure beneath the pipeline for supporting the same, are cleared by the frame 10, eliminating the necessity of removing the machine from the pipeline as the same is shifted from one joint to the next.

All of the advantageous features above outlined are retained in the embodiment shown in Figs. 6–9 and additionally, a rotatable disc 100 is provided to limit the extent of movement of the wire brush 102 toward the weld 104 under influence of spring 106.

Motor 108 for driving cleaning means 102 through belt-pulley means 110 is mounted on a platform 112 that is in turn swingable on cross-rod 114 interconnecting innermost frame members 116. An extension 118 from platform 112 supports brush 102, and spring 106 is interposed between the extension 118 and a cross-rod 120 interconnecting upper frame members 122.

Disc 100 is carried by an arm 124 projecting forwardly from extension 118 and while the arm 124 is normally rigidly held in place for swinging movement with brush 102, its angularity is adjustable through any suitable means, not shown.

Means similar to that provided in Figs. 1–5 swings brush 102 clear of the weld 104 upon manipulation of crank 126.

In all essential respects lock 128 is the same as lock 62 except only that rod 130 thereof is engageable by a swingable, spring-load retainer latch 132 as best seen in Fig. 9.

All of the rollers and wheels, as well as disc 100, may advantageously be made from rubber or similar material, and any tendency of the brush 102 to deflect out of the groove containing weld 104 will be avoided by the tracking action of disc 100 within such groove. It also prevents brush 102 from flattening out in the groove under the action of spring 106, thereby assuring better tracking and more particularly, causing the relatively thin, peripheral edge of brush 102 to more effectively remove the slag from the bottom of the groove.

It can be appreciated that through use of machines of the types above described, it is possible to more efficiently clean all of the slag from each weld even at the bottom of the notch forming the joint. Furthermore, the operation is extremely fast and, therefore, the welding crews need not remain idle awaiting the slag-removing operation as has heretofore been the case when manual slag-removing operations have been necessary.

Having thus described the invention what is claimed as new and desired to be secured by Letters Patent is:

1. A pipeline weld cleaning machine comprising an arcuate frame adapted to surround more than one-half of the pipeline and having a pair of spaced ends; a pipeline-engaging roller mounted on the frame at each of said ends respectively; a tightener swingable on the frame intermediate said ends; a pipeline-engaging roller mounted on said tightener and disposed to draw all the rollers into tight engagement with the pipeline upon swinging of the tightener in one direction; means mounted on the frame for cleaning a weld on the pipeline as the frame is rotated about the pipeline on said rollers; and means for supporting the frame on the pipeline for movement longitudinally therealong when the tightener is swung in the opposite direction.

2. A pipeline weld cleaning machine comprising an arcuate frame adapted to surround more than one-half of the pipeline and having a pair of spaced ends; a pipeline-engaging roller mounted on the frame at each of said ends respectively; a tightener swingable on the frame intermediate said ends; a pipeline-engaging roller mounted on said tightener and disposed to draw all the rollers into tight engagement with the pipeline upon swinging of the tightener in one direction; means mounted on the frame for cleaning a weld on the pipeline as the frame is rotated about the pipeline on said rollers; and wheels mounted on the frame for supporting the same upon movement of the frame along the pipeline longitudinally thereof when the tightener is swung in the opposite direction.

3. A pipeline weld cleaning machine comprising an arcuate frame adapted to surround more than one-half of the pipeline and having a pair of spaced ends; a pipeline-engaging roller mounted on the frame at each of said ends respectively; a tightener swingable on the frame intermediate said ends; a pipeline-engaging roller mounted on said tightener and disposed to draw all the rollers into tight engagement with the pipeline upon swinging of the tightener in one direction; means mounted on the frame for cleaning a weld on the pipeline as the frame is rotated about the pipeline on said rollers; latch means on the frame for holding the tightener at one end of its path of travel; and means for supporting the frame on the pipeline for movement longitudinally therealong when the tightener is swung in the opposite direction.

4. A pipeline weld cleaning machine comprising a frame; roller means on the frame for mounting the same on the pipeline for rotation therearound; releasable structure for clamping the frame to the pipeline with the rollers in tight engagement therewith, said frame being shiftable toward the pipeline and the roller means being shiftable away from the pipeline upon release of said structure; cleaning means mounted on the frame for engagement with a weld in said pipeline as the frame is rotated; and means on the frame movable into engagement with the pipeline as the frame shifts for supporting the latter for longitudinal movement along the pipeline.

5. A machine of the kind described comprising a frame adapted to partially surround a pipeline and having a pair of spaced ends; a pipeline engaging member mounted on the frame at each of said ends respectively; a tightener movable on the frame intermediate said ends; a pipeline engaging member mounted on said tightener and disposed to draw all the members into engagement with the pipeline upon movement of the tightener in one direction; cleaning means mounted on the frame for engagement with the pipeline as the frame is rotated about the pipeline with said members engaging the latter and moving relative thereto; and means mounted on the frame for supporting the same upon movement of the frame along the pipeline longitudinally thereof when the tightener is moved in the opposite direction.

References Cited in the file of this patent

UNITED STATES PATENTS

| | | |
|---|---|---|
| 500,443 | Tyler | June 27, 1893 |
| 554,028 | Marso | Feb. 4, 1896 |
| 1,647,499 | Bly | Nov. 1, 1927 |
| 1,715,289 | Hellman | May 28, 1929 |
| 1,815,573 | McManis | July 21, 1931 |
| 1,898,964 | Jinnett | Feb. 21, 1933 |
| 2,271,582 | Dixon | Feb. 3, 1942 |
| 2,365,984 | Warren | Dec. 26, 1944 |
| 2,436,099 | Cummings et al. | Feb. 17, 1948 |